Figure 1:
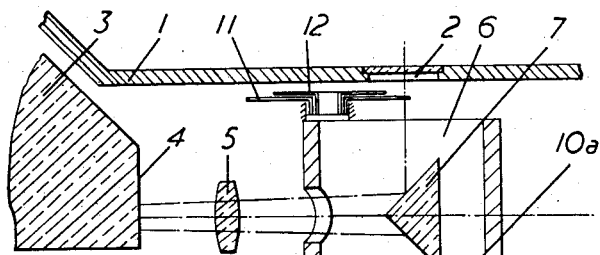

Jan. 23, 1962  H. KODALLE ET AL  3,017,812
PHOTOGRAPHIC CAMERA

Filed May 9, 1960  2 Sheets-Sheet 1

Inventors
HORST KODALLE
GERHARD SEIFERT

By Irwin J. Thompson
Attorney

Jan. 23, 1962  H. KODALLE ET AL  3,017,812
PHOTOGRAPHIC CAMERA
Filed May 9, 1960  2 Sheets-Sheet 2
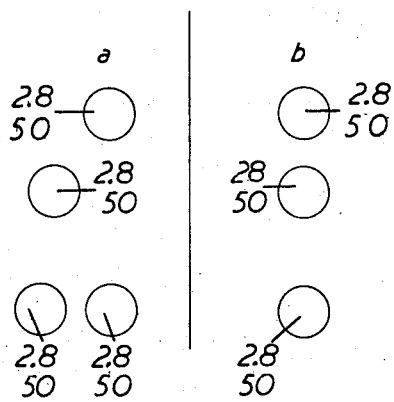
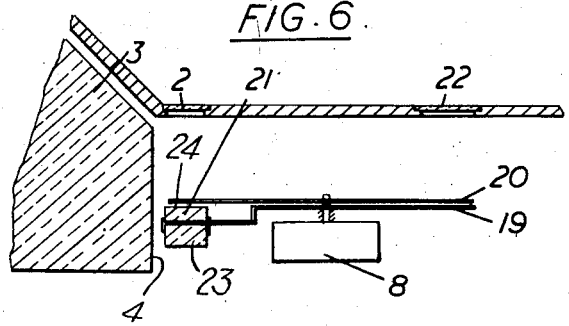
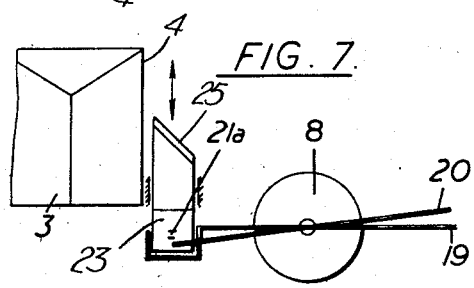
Inventors
HORST KODALLE
GERHARD SEIFERT
By Irwin A. Thompson
Attorney

United States Patent Office 3,017,812
Patented Jan. 23, 1962

3,017,812
PHOTOGRAPHIC CAMERA
Horst Kodalle and Gerhard Seifert, Dresden, Germany, assignors to VEB Kamera- und Kinowerke Dresden, Dresden, Germany
Filed May 9, 1960, Ser. No. 27,836
6 Claims. (Cl. 95—10)

The invention concerns an arrangement for the reflection of exposure factor indicator values in the viewfinder light ray path of a monocular reflex photographic camera, which allows the user to set or adjust all the values of interest for correct exposure, such as diaphragm aperture, exposure time and exposure meter indication, without the camera having to be removed from the eye, but also permits observation of the exposure meter setting in an aperture of the camera covering housing.

A number of constructions are known which allow the various exposure factor indicators of an exposure meter arrangement to be seen in the viewfinder image or on a number of sides of the photographic camera.

These known arrangements have the disadvantage that they require, particularly in the case of monocular mirror reflex cameras having inverting prisms, a considerable mechanical expenditure, which has an unfavourable effect upon the price and the structural size of the camera. It is equally disadvantageous that in these arrangements every exposure factor indicator must be read off on a different side of the viewfinder image, that is to say they cannot be viewed at one glance.

The invention removes these disadvantages and achieves further advantages due to the fact that it provides within the range of sight and accommodation of the viewing eye a light diffusing and viewing surface, upon which an objective lens reproduces those portions of the exposure factor indicators which indicate the required values.

For the same purpose the optical parts are arranged in such a way that the positions of both the exposure meter indicator or pointer and also a follow-up indicator or pointer of an electric exposure meter arrangement are viewed in the vicinity of the pivot centres of both pointers. In further development of the invention the objective lens reproduces simultaneously at the light diffusing and viewing surface the exposure factors of the diaphragm aperture, the exposure time and the pointers of the exposure meter arrangement.

In another development of the invention the exposure meter pointer carries a prismatic bar having indicator or setting marks and an image of the setting marks and the end of the follow-up pointer is reproduced on the light diffusing and viewing surface.

Now the invention is to be explained in greater detail hereinafter with reference to some examples of embodiment, from which further features peculiar thereto may be seen. All details of the photographic camera have been omitted which are not directly connected with the invention.

Figure 2:
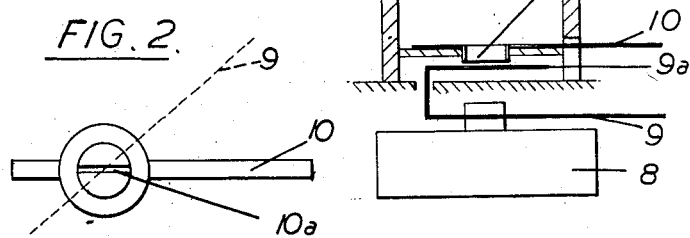
Figure 3:
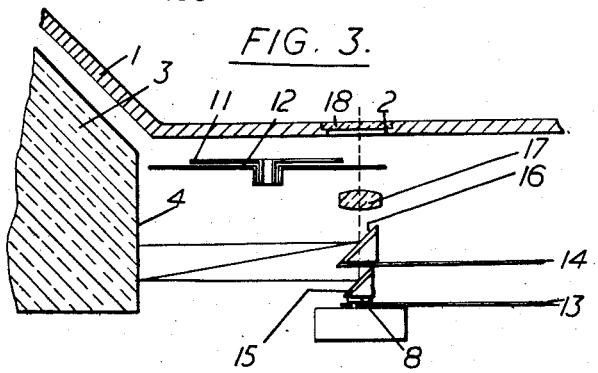
Figure 4:
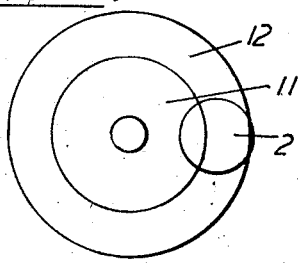

FIGURE 1 shows a longitudinal section through a camera housing with the arrangement in accordance with the invention, FIGURE 2 shows a plan view of the indicator or pointer arrangement corresponding to FIGURE 1, FIGURE 3 shows a longitudinal section through the camera housing with another arrangement in accordance with the invention, FIGURE 4 shows a plan view of the diaphragm aperture and exposure time scales corresponding to FIGURE 3, FIGURE 5 shows the images seen on the light diffusing and viewing surface for two arrangements corresponding to FIGURE 3 with the conditions of correct and incorrect setting in each case, FIGURE 6 shows a longitudinal section through the housing with a follow-up pointer carrying a prismatic bar, FIGURE 7 shows the plan view of FIGURE 6.

The first example of embodiment according to FIGURES 1 and 2 shows the arrangement in its application to the case of a mirror-reflex camera with pentahedral roof prism viewfinder. In a housing 1 with a light aperture 2 there is arranged a pentahedral roof prism 3 having a light diffusing and viewing surface 4. This surface 4 is not the conventional light diffusing surface of a roof prism on which an image of the object to be photographed will be projected. However, the surface 4 is arranged such that images projected thereon may be seen in the viewfinder eyepiece to one side of the image of the object to be photographed.

Also arranged in the housing 1 are an objective lens 5, a mirrored space 6, a reflecting prism 7, a photo-electric moving coil exposure meter 8, a meter indicator or pointer 9 operatively connected to the moving coil, a follow-up indicator or pointer 10 and, mounted coaxially, a diaphragm aperture scale 11 and an exposure time scale 12.

The mirrored space 6 is formed by a cylinder which is closed at one end; the internal surfaces of the cylinder and of the closed end having mirror finishes.

The reflecting prism 7 is here secured approximately in the centre of the mirrored space 6, the upper, open side of which faces the light aperture 2 in the housing 1. Between the reflecting prism 7 and the light aperture 2 there lie the rotatably movable, transparent scales for diaphragm aperture (11) and exposure time (12). On the under side of the mirrored space 6 over the reflective bottom thereof there move parts of the meter pointer 9 and of the follow-up pointer 10. The objective lens 5 is arranged between the light diffusing surface 4 and the reflecting prism 7.

The follow-up pointer 10 is driven through a transmission arrangement not shown, by an adjustable diaphragm of the camera (not shown) and by an exposure time setting device of the camera (not shown). The diaphragm aperture scale 11 is connected to the adjustable diaphragm and the exposure time scale 12 is connected to the time setting device.

Thus when the camera is in use and an object to be photographed is viewed in the eyepiece the pointer 9 of the exposure meter 8 will be deflected to a certain position by the moving coil of the meter 8. Adjustments of the diaphragm of the camera and of the exposure time setting device will then be effected to align the follow-up pointer with the pointer 9, and the exposure factors will then be correct for picture-taking. As these adjustments are made the respective scales 11 and 12 will be rotated so that the exposure factors set will appear beneath the light aperture 2.

The exposure factors set and the relative positions of the pointer 9 and follow-up pointer 10 will be seen on the light diffusing and viewing surface 4 as follows. A part of the light rays entering through the light aperture 2 and the housing 1 penetrates through the transparent scales for diaphragm aperture (11) and exposure time (12) and falls upon the surface of the reflecting prism 7. Thence it is reflected to the objective lens 5, which reproduces the values of the diaphragm aperture scale 11 and of the exposure time scale 12 upon the light diffusing and viewing surface 4 of the pentahedral roof-prism. The other light rays, not needed for the reproduction of the diaphragm aperture and exposure time values, are reflected by the reflecting internal surfaces of the mirrored space 6 and thus illuminate the background of the parts of the pointers 9 and 10 situated in the mirrored space 6.

The axis of rotation of the two pointers 9 and 10 is so disposed that in its extension it coincides with the reflecting surface of the reflecting prism 7. Thus this axis becomes the optical axis for the light ray beam which is reflected from this reflecting surface to the objective lens 5, and an image of those parts of pointers 9 and 10 in the vicinity of the pivot centres is reproduced at the light diffusing and viewing surface 4. This image shows a wire 10a stretched over the central hole in the follow-up pointer 10 and also shows part of the meter pointer 9 (FIGURE 2) so disposed that the wire and the meter pointer 9 intersect before adjustment and coincide when the settings are correct.

In this manner there are simultaneously produced, at one side of the main viewfinder picture, two pictures lying side by side, of which one shows the values for diaphragm aperture and exposure time and the other the position of the meter pointer 9 in relation to the follow-up pointer 10.

The second example of embodiment as illustrated in FIGURES 3 to 5 shows an arrangement wherein in the housing 1 beneath the light aperture 2 there are mounted a light-diffusing plate 18, the diaphragm aperture scale 11, the exposure time scale 12, an objective lens 17, a meter indicator or pointer 13 with a mirror 15 and a follow-up pointer 14 with a partially transparent mirror 16. Furthremore the housing 1 again encloses the pentahedral roof prism 3 with its light diffusing and viewing surface 4. The mirrors 15 and 16 are set obliquely to the optical axis of the viewfinder.

The light rays entering through the light aperture 2 penerate through the light-diffusing plate 18, the transparent diaphragm aperture scale 11 and the equally transparent exposure time scale 12. They are then focused by the objective lens 17 and pass to the mirrors 15 and 16. 50% of the light rays are reflected by the mirror 16 to the light diffusing and viewing surface 4, while the other 50% are reflected by the mirror 15 to the light diffusing and viewing surface 4. In this way a picture of the diaphragm aperture and exposure time scales is projected on the light diffusing and viewing surface 4. Since the mirrors 15 and 16 rotate with the pointers 13 and 14 the pictures of the diaphragm aperture and exposure time scales travel, according to the deflection of the pointers, back and forth across the surface 4. The position of the mirrors 15 and 16 can be so selected that the pictures lie either side by side or one above the other when the settings are correct. FIGURE 5a shows the two possibilities before adjustment, FIGURE 5b the two possibilities with the correct setting. The picture of the diaphragm aperture and exposure time scales shows the set values and these can be read off, while the position of the pictures in relation to one another shows the setting of the exposure meter pointer and follow-up pointer arrangement.

FIGURES 6 and 7 represent a possible form of embodiment wherein a follow-up indicator or pointer 19 carries a prismatic bar 21 with an indicator or setting mark 21a, over which there moves one end of a meter indicator or pointer 20.

The prismatic bar 21 is arranged in the camera housing 1 beneath the light aperture 2. The bar 21 has an oblique end surface 23. Light entering through the aperture 2 passes through the top surface 24 of the bar 2, is reflected by the surface 23 along the length of the bar 2 and is again reflected by an oblique end surface 25 of the bar onto the light diffusing and viewing surface 4 of the pentahedral prism 3.

Thus images of the diaphragm aperture scale (not shown), the exposure time scale (not shown), the meter pointer 20 and the setting mark 21a are projected onto the surface 4.

The follow-up pointer 19 is again connected through a transmission arrangement (not shown) to the adjustable diaphragm (not shown) and exposure time setting device (not shown) of the camera and also to the respective factor indicators (not shown).

Apart from the pictures projected on the surface 4 of the pentahedral roof prism 3 and viewed through the viewfinder eyepiece (not shown), an aperture 22 in the housing 1, for all the illustrated examples of embodiment, allows the pointer setting of the exposure meter arrangement to be viewed from above the top of the housing 1.

We claim:

1. In a monocular reflex camera having a housing, a pentahedral roof prism viewfinder mounted in the housing, an adjustable diaphragm mounted in the housing, a photo-electric moving coil exposure meter mounted in the housing and an exposure time setting device mounted in the housing, the provision of a light diffusing and viewing surface on the pentahedral prism, said surface being arranged within the range of sight and accommodation of the viewing eye, an indicator operatively connected to the moving coil, a follow-up indicator pivotally mounted in the housing and movable to coincide with the indicator on the moving coil, a transparent diaphragm aperture scale rotatably mounted in the housing, a transparent exposure time scale rotatably mounted in the housing and coaxial with the diaphragm aperture scale, means for transmitting adjustments of the diaphragm and of the exposure time setting device to the follow-up pointer and to the diaphragm aperture scale and exposure time scale respectively, means for reproducing images of the exposure meter indicator and the follow-up indicator on the light diffusing and viewing surface and means for reproducing images of the diaphragm aperture scale and of the exposure time scale on the light diffusing and viewing surface.

2. In a monocular reflex camera having a housing, a pentahedral roof prism viewfinder mounted in the housing, an adjustable diaphragm mounted in the housing, a photo-electric moving coil exposure meter mounted in the housing and an exposure time setting device mounted in the housing, the provision of a light diffusing and viewing surface on the pentahedral prism, said surface being arranged within the range of sight and accommodation of the viewing eye, an indicator operatively connected to the moving coil, a follow-up indicator pivotally mounted in the housing and movable to coincide with the indicator on the moving coil, a transparent diaphragm aperture scale rotatably mounted in the housing, a transparent exposure time scale rotatably mounted in the housing and coaxial with the diaphragm aperture scale, means for transmitting adjustments of the diaphragm and of the exposure time setting device to the follow-up pointer and to the diaphragm aperture scale and exposure time scale respectively, and means for reproducing images of the exposure meter indicator and the follow-up indicator on the light diffusing and viewing surface and for reproducing images of the diaphragm aperture scale and of the exposure time scale on the light diffusing and viewing surface.

3. In a monocular reflex camera having a housing, a pentahedral roof prism viewfinder mounted in the housing, an adjustable diaphragm mounted in the housing, a photo-electric moving coil exposure meter mounted in the housing and an exposure time setting device mounted in the housing, the provision of a light diffusing and viewing surface on the pentahedral prism, said surface being arranged within the range of sight and accommodation of the viewing eye, an indicator operatively connected to the moving coil, a follow-up indicator pivotally mounted in the housing and movable to coincide with the indicator on the moving coil, a transparent diaphragm aperture scale rotatably mounted in the housing, a transparent exposure time scale rotatably mounted in the housing and coaxial with the diaphragm aperture scale, means for transmitting adjustments of the diaphragm and of the exposure time setting device to the follow-up pointer and to the diaphragm aperture scale and exposure time scale respectively and means including a lens and a prism for reproducing images of the exposure meter indicator and the follow-up indicator on the light diffusing and viewing surface and for reproducing images of the diaphragm aperture scale and of the exposure time scale on the light diffusing and viewing surface.

4. In a monocular reflex camera having a housing, a pentahedral roof prism viewfinder mounted in the housing, an adjustable diaphragm mounted in the housing, a photo-electric moving coil exposure meter mounted in the housing and an exposure time setting device mounted in the housing, the provision of a light diffusing and viewing surface on the pentahedral prism, said surface being arranged within the range of sight and accommodation of the viewing eye, an indicator operatively connected to the moving coil, a follow-up indicator pivotally mounted in the housing and movable to coincide with the indicator on the moving coil, a transparent diaphragm aperture scale rotatably mounted in the housing, a transparent exposure time scale rotatably mounted in the housing and coaxial with the diaphragm aperture scale, a mirror arranged to reflect light passing through a light aperture in the housing onto the follow-up indicator and moving coil indicator, means for transmitting adjustments of the diaphragm and of the exposure time setting device to the follow-up pointer and to the diaphragm aperture scale and exposure time scale respectively, and means including a lens and a prism for reproducing an image of the exposure meter indicator and the follow-up indicator on the light diffusing and viewing surface and for reproducing images of the diaphragm aperture scale and of the exposure time scale on the light diffusing and viewing surface.

5. In a monocular reflex camera having a housing, a pentahedral roof prism viewfinder mounted in the housing, an adjustable diaphragm mounted in the housing, a photo-electric moving coil exposure meter mounted in the housing and an exposure time setting device mounted in the housing, the provision of a light diffusing and viewing surface on the pentahedral prism, said surface being arranged within the range of sight and accommodation of the viewing eye, an indicator operatively connected to the moving coil, a follow-up indicator pivotally mounted in the housing and movable to coincide with the indicator on the moving coil, a transparent diaphragm aperture scale rotatably mounted in the housing, a transparent exposure time scale rotatably mounted in the housing and coaxial with the diaphragm aperture scale, means for transmitting adjustments of the diaphragm and of the exposure time setting device to the follow-up pointer, an aperture in the housing through which light may enter and pass through the transparent diaphragm aperture scale and through the transparent exposure time scale, a partially transparent mirror mounted on the follow-up indicator and arranged to reflect part of the light onto the light diffusing and viewing surface and a mirror mounted on the moving coil indicator and arranged to reflect the remainder of the light onto the light diffusing and viewing surface.

6. In a monocular reflex camera having a housing, a pentahedral roof prism viewfinder mounted in the housing, an adjustable diaphragm mounted in the housing, a photo-electric moving coil exposure meter mounted in the housing and an exposure time setting device mounted in the housing, the provision of a light diffusing and viewing surface on the pentahedral prism, said surface being arranged within the range of sight and accommodation of the viewing eye, an indicator operatively connected to the moving coil, a follow-up indicator pivotally mounted in the housing, a prismatic bar mounted on the follow-up indicator, an indicator or setting mark on the prismatic bar, said follow-up pointer being movable to coincide the indicator or setting mark with the indicator on the moving coil, a transparent diaphragm aperture scale rotatably mounted in the housing, a transparent exposure time scale rotatably mounted in the housing and coaxial with the diaphragm aperture scale, means for transmitting adjustments of the diaphragm and of the exposure time setting device to the follow-up pointer and an aperture in the housing through which light may enter and pass through the transparent diaphragm aperture scale and through the transparent exposure time scale, the prismatic bar being arranged to reflect the light onto the light diffusing and viewing surface.

References Cited in the file of this patent

UNITED STATES PATENTS

| | | |
|---|---|---|
| 2,242,043 | Sanger | May 13, 1941 |
| 2,297,428 | Nuchterlein | Sept. 29, 1942 |
| 2,784,654 | Meyer | Mar. 12, 1957 |
| 2,926,571 | Sommer | Mar. 1, 1960 |
| 2,933,991 | Sauer | Apr. 26, 1960 |

FOREIGN PATENTS

| | | |
|---|---|---|
| 466,923 | Great Britain | June 8, 1937 |